United States Patent [19]
Carriere

[11] Patent Number: 5,868,295
[45] Date of Patent: Feb. 9, 1999

[54] COLLAPSIBLE CONTAINER SYSTEM FOR TRUCK BEDS

[76] Inventor: Richard D. Carriere, 7228 Spruce St., New Orleans, La. 70118

[21] Appl. No.: 751,503

[22] Filed: Nov. 18, 1996

[51] Int. Cl.$^6$ ............................................. B60P 1/64
[52] U.S. Cl. ................................. 224/404; 224/498
[58] Field of Search ................... 224/404, 403, 224/498, 497, 318, 314; 190/24, 107

[56] References Cited

U.S. PATENT DOCUMENTS

| | | | |
|---|---|---|---|
| 1,837,537 | 12/1931 | Emerson . | |
| 2,576,327 | 11/1951 | Wright | 224/42.45 |
| 2,728,426 | 12/1955 | Dobyns | 190/107 |
| 3,476,162 | 11/1969 | McMiller | 224/318 X |
| 4,260,091 | 4/1981 | French et al. | 224/311 |
| 4,718,583 | 1/1988 | Mullican | 224/404 |
| 5,340,004 | 8/1994 | Moore | 224/404 X |
| 5,366,124 | 11/1994 | Dearborn, IV | 224/404 X |
| 5,368,210 | 11/1994 | Wotring | 224/404 |
| 5,392,972 | 2/1995 | Caruso et al. | 224/42.034 |

*Primary Examiner*—Renee S. Luebke
*Attorney, Agent, or Firm*—Joseph N. Breaux

[57] ABSTRACT

A collapsible container system for use on the bed of a truck including a flexible, water resistant, fabric bag assembly having a sealable opening in connection with a storage chamber for storing articles to be transported. The bottom of the bag assembly is coated or otherwise treated to be waterproof so that standing water is prevented from soaking through the water resistant fabric. The container system also includes a pair of rigid braces that are securable to the interior surface of two opposed sidewalls of the bag assembly. Each of the rigid braces extends to the corners of its respective opposed sidewall. The exterior surface of each of the opposed sidewalls is provided with a mechanism for securing the end of at least one and preferably two or more securing cords. The other end of each of the securing cords is provided with a mechanism for attachment to the body of the truck. In use, one end of each of the securing cords is attached to the exterior of one of the two thus braced opposed sidewalls and the other end of each securing cord is attached so the truck body in a manner such that the bag assembly is stretched therebetween and held in the expanded configuration.

3 Claims, 3 Drawing Sheets

COLLAPSIBLE CONTAINER SYSTEM FOR TRUCK BEDS

TECHNICAL FIELD

The present invention relates to containers for covering and protecting items to be transported in an open truck bed and more particularly to a collapsible container system for use in the bed of a truck that includes a flexible, water resistant, fabric bag assembly having a sealable opening in connection with a storage chamber for storing articles to be transported in the bed of a truck. The container system also includes a pair of braces that are securable to the interior surface of two opposed sidewalls of the bag assembly to provide rigid support to the sidewalls so that the bag assembly can held in an expanded configuration for use by two or more securing cords. In use, one end of each of the securing cords is attached to an exterior of one of the two thus braced sidewalls and the other end of the securing cord is attached to the truck body with the bag assembly stretched therebetween and held in the expanded configuration. The bottom of the bag assembly is coated or otherwise treated to be waterproof so that standing water is prevented from soaking through the water resistant fabric.

BACKGROUND OF THE INVENTION

Because pickup trucks have limited passenger compartment space and no trunk space, it is often necessary to place items to be transported by these vehicles in the bed section of the truck where they are exposed to the weather including wind, dust, rain and snow. Although many items are not effected by such exposure, many items such as groceries, luggage, etc. can be damaged or ruined if exposed to one or more of these elements. It would be a benefit, therefore, to have a container positioned in the bed of the truck for covering these items and protecting them during transportation. One solution to this problem is to install a hard sided container having a hinged cover in the truck bed to store and transport these items. Although such hard sided containers work well, they reduce the size of the bed and, thereby, limit the beds use. It would be a benefit, therefore to have a container for protecting items from the elements during transporting of the items in the bed of a pickup truck that was collapsible for storage within the cab of the pickup truck when not needed or when the full bed of the pickup was needed. It would also be desirable if the collapsible container was easily and rapidly installed when needed and removed when not needed. It would of course also be desirable to have such a collapsible container that was inexpensive to manufacture.

SUMMARY OF THE INVENTION

It is thus an object of the invention to provide a collapsible container system for truck beds for protecting items from the elements during transporting of the items in the bed of a pickup truck that is collapsible for storage within the cab of the pickup truck.

It is a further object of the invention to provide a collapsible container system for truck beds that is easily and rapidly installed and removed.

It is a still further object of The invention to provide a collapsible container system for truck beds that is inexpensive to manufacture.

It is a still further object of the invention to provide a collapsible container system for truck beds that includes a flexible, water resistant, fabric bag assembly having a sealable opening in connection with a storage chamber for storing articles to be transported in the bed of a truck.

It is a still further object of the invention to provide a collapsible container system for truck beds that includes a pair of braces that are securable to the interior surface of two opposed sidewalls of a flexible, water resistant, fabric bag assembly to provide rigid support to the sidewalls so that the bag assembly is held in an expanded configuration for use by two or more securing cords.

It is a still further object of the invention to provide a collapsible container system for truck beds that accomplishes all or some of the above objects in combination.

Accordingly, a collapsible container system for use in the bed of a truck is provided. The container system includes a flexible, water resistant, fabric bag assembly having a sealable opening in connection with a storage chamber for storing articles to be transported. The term "fabric" is used herein to mean woven fabrics, such as canvas, and sheeting materials, such as vinyl and plastic sheeting suitable for bag coilstructior.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
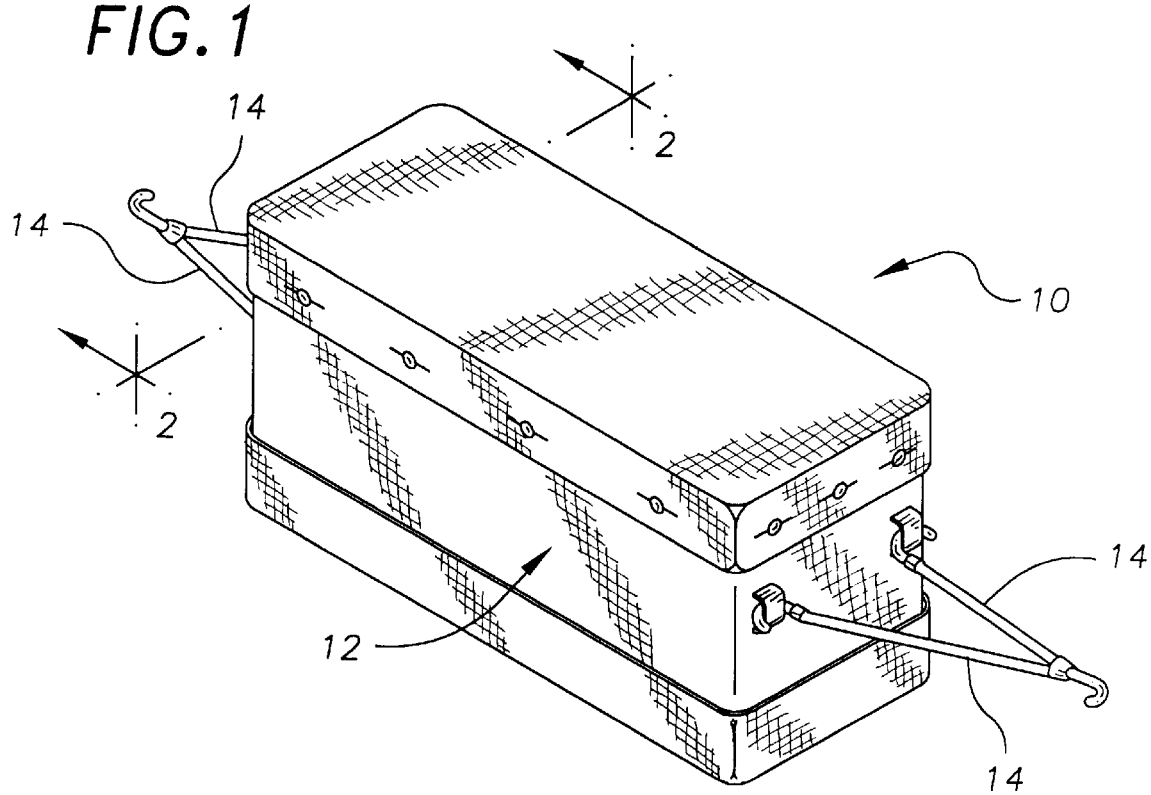
FIG. 1 is a perspective view of an exemplary embodiment of the collapsible container system for truck beds of the present invention showing an exemplary bag assembly and four identical exemplary securing cords.

FIG. 1 shows an exemplary embodiment of the collapsible container system for truck beds of the present invention generally designated by the numeral 10. Exemplary container system 10 includes a flexible, water resistant, fabric bag assembly, generally designated 12, two identical rigid braces, generally designated 13 (one shown in FIG. 2), and four securing cords 14.

Figure 2:
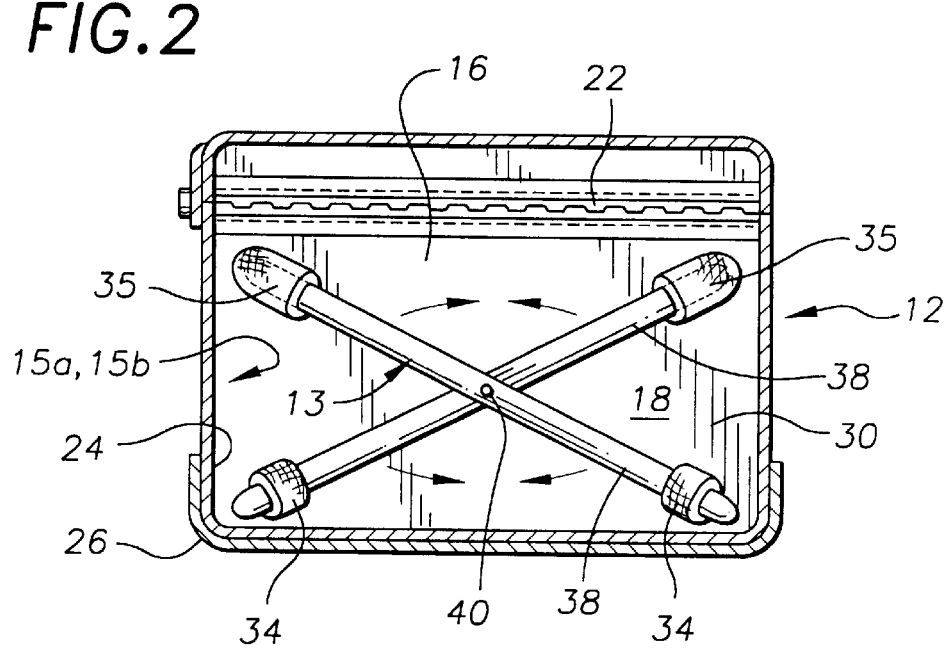
FIG. 2 is a sectional view of the bag assembly of FIG. 1 along the line I—I showing one of the identical opposed sidewalls, the sealable zippered opening, the zipper cover flap, the two lower race securing loops, the two upper brace securing pockets, and one of the two identical exemplary rigid braces.
Figure 7:
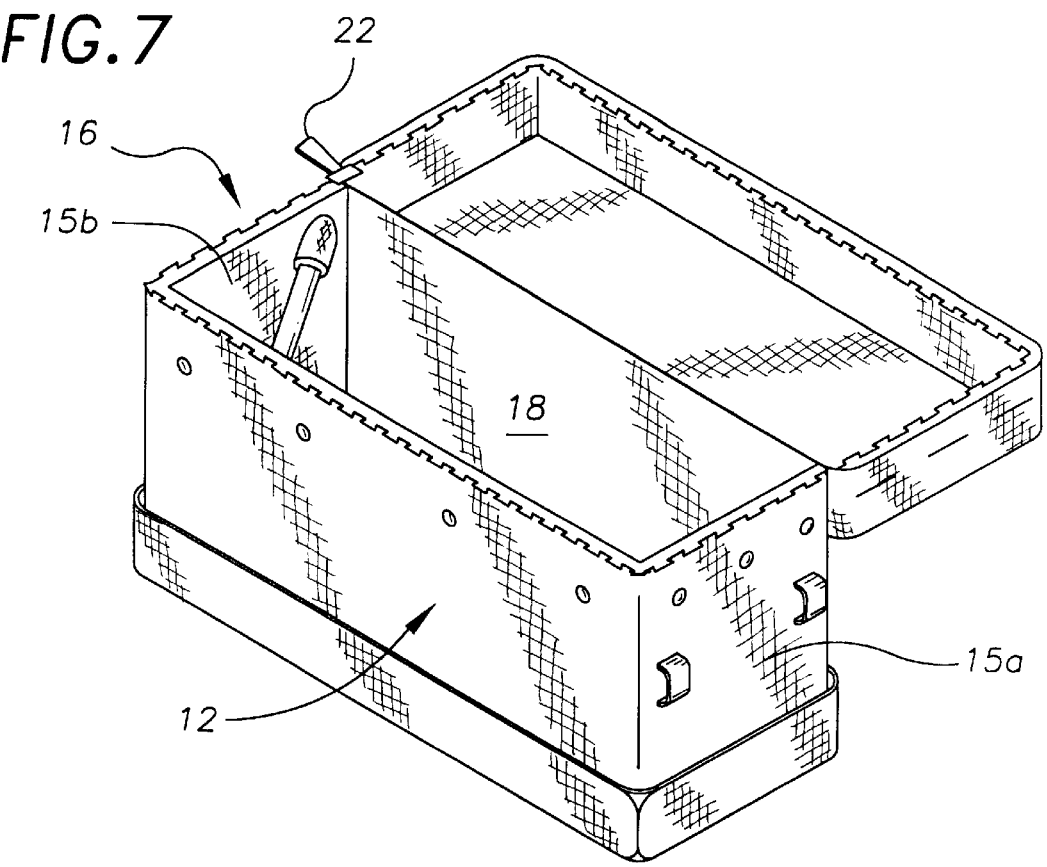
FIG. 7 is a perspective view of the bag assembly of FIG. 1 with the sealable zippered opening unzipped and the top cover folded back to reveal the item storage compartment, and a portion of one of the rigid braces.

With reference to FIG. 2, bag assembly 12 is manufactured conventionally by stitching and sewing water resistant canvas fabric panels together to form a substantially rectangular bag having a pair of opposed sidewalls 15a,15b (FIG. 7), and a sealable opening 16 (shown more clearly in FIG. 7) in connection with a storage chamber 18 (shown more clearly in FIG. 7) for storing articles to be transported. In this embodiment sealable opening 16 is sealable with a zipper closure 22 that is provided along three sides (see FIG. 7) of bag assembly 12. A bottom portion 24 of bag assembly 12 is coated with a rubber coating 26 to make bottom portion 24 sufficiently waterproof to prevent water from penetrating into storage chamber 18 when bottom portion 24 is standing in water accumulated within the bed of the truck. Rubber coating 26 is for waterproofing purposes and is sufficiently thin to allow bottom portion 24 to remain flexible so as not to interfere with folding or rolling bag assembly 12 for storage.

Each opposed sidewall 15a,15b has an interior sidewall surface that partially defines storage compartment 18 and has two brace securing loops 34 attached thereto at the bottom thereof and two brace securing pockets 35 attached thereto at the top thereof for securing a rigid brace 13 to a sidewall 15a,15b. Each securing loop 34 or securing pocket 35 is positioned at a corner of interior sidewall surface 30 so that the corners of sidewall 15a,15b are provided with support from a rigid brace 13. Although fabric brace securing loops and brace securing pockets are used in this exemplary embodiment, the terms "brace securing Loop" and the term brace securing pocket" are are intended to encompass any securing mechanism or combination of mechanisms for attaching the rigid brace in place such as for example only metal D-rings, O-rings, metal fasteners, hook and pile strips, etc.

Figure 3:
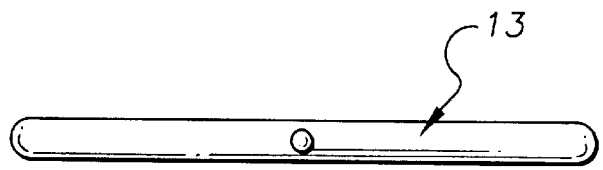
FIG. 3 is a top view of the rigid brace of FIG. 2 when the first and second sections are pivoted into a closed position.
Figure 4:
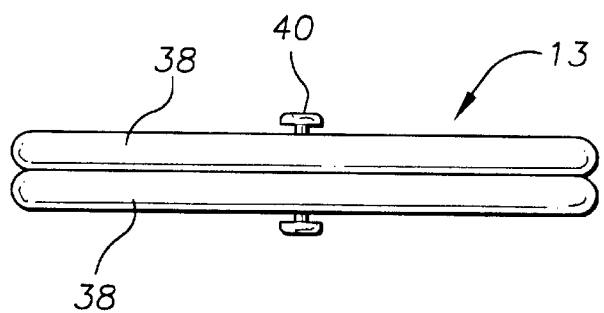
FIG. 4 is a side plan view of the rigid brace of FIG. 3 in the closed position.

In this embodiment rigid braces 13 are constructed in an X-shaped configuration from two lengths 38 of stainless steel bar stock that have been pivotally connected at the centers thereof by a tightly attached rivet. The pivotal connection allows rigid braces 13 to be closed as shown in FIG. 3 and 4 or convenient storage under or behind the seat of the truck when container system 10 is not needed. In addition, bag assembly 12 can be flattened along with closing rigid braces 13 and the bag assembly rolled or folded for storage beneath or behind the seat.

Figure 5:
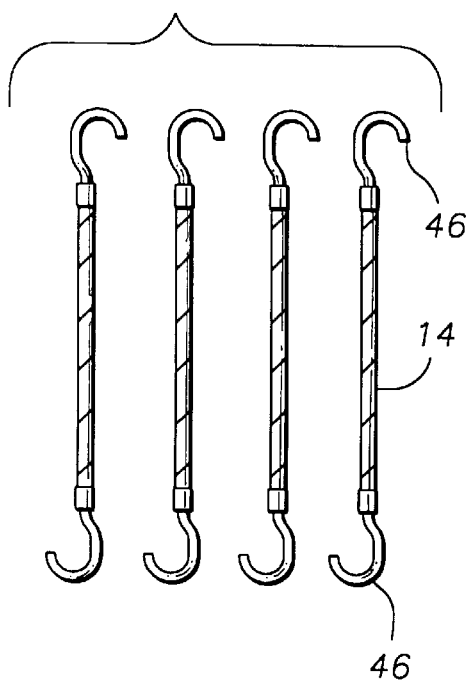
FIG. 5 is a is a plan view of the four elastic securing cords showing the central elastic section and the two end hooks.
Figure 6:
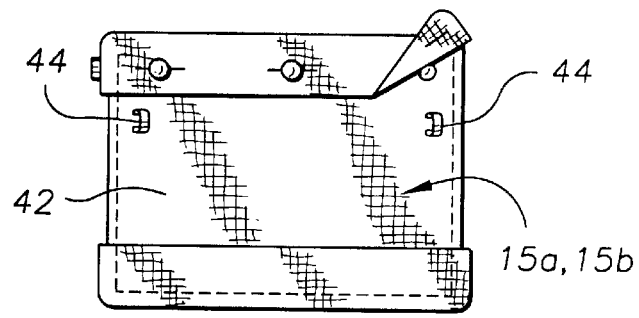
FIG. 6 is a side view of the bag assembly of FIG. 1 showing a corner of the zipper cover flap lifted to reveal the zipper pull and one of the cover securing buttons used to maintain the zipper cover flap over the zipper in use.

With reference to FIG. 6, an exterior surface 42 of each of opposed sidewalls 15a,15b is provided with two canvas fabric securing cord securing loops 44 at the upper corners thereof. Although fabric securing cord securing loops are used in this exemplary embodiment, the term "securing cord securing Loops" is intended to encompass any attachment mechanism for securing the securing an end of a securing cord to the bag assembly including D-shaped metal rings, O-rings, manageable fasteners, hook and pile fasteners, etc. With reference to FIG. 5, securing cord securing loops 44 provide a point for attaching one of the two securing hooks 46 provided at the ends of each elastic securing cord 14. In this embodiment, securing cords 4 are conventional elastic cords.

Figure 8:
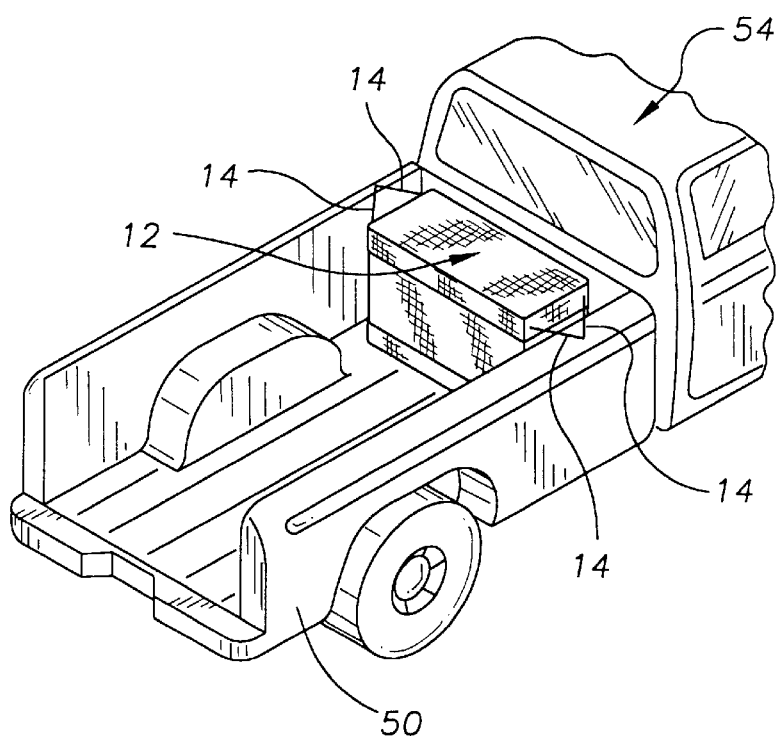
FIG. 8. is a perspective view of the exemplary container system installed on the bed of a representative pickup truck

With reference to FIG. 8, in use, one hook 46 (FIG. 5) of each elastic securing cord 14 is attached to a securing loop 44 (FIG. 6) and the other hook 46 is attached to the truck body 50 of the truck 54 in a manner such that elastic forces pull opposed sidewalls 15a,15b (FIG. 7) apart as far as possible. The elastic forces from elastic securing cords 14 in combination with support from rigid braces 13 maintain bag assembly 12 in an expanded configuration for use.

It can be seen from the preceding description that a collapsible container system for truck beds has been provided that is collapsible for storage within the cab of the pickup truck; that is easily and rapidly installed and removed; that is inexpensive to manufacture; that includes a flexible, water resistant, fabric bag assembly having a sealable opening in connection with a storage chamber for storing articles; and that includes a pair of braces that are securable to the interior surface of two opposed sidewalls of a flexible, water resistant, fabric bag assembly.

It is noted that the embodiment of the collapsible container system for truck beds described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the Law, it is to be understood that the details herein are to be interpreted as illustrative and not in a limiting sense.

What is claimed is:

1. A collapsible container system comprising:

a flexible, water resistant, fabric bag assembly having a sealable opening in connection with a storage chamber for storing articles to be transported, said bag assembly having a length that is less than a width of a truck bed defined between a pair of opposed sidewalls, a bottom portion of said bag assembly being waterproofed in a manner to remain flexible;

a pair of rigid braces, each securable to an interior surface of one of said two opposed sidewalls of said bag assembly, each of said rigid braces extending to four corners of a respective opposed sidewall;

at least two securing cords, each securing cord being securable between one of said opposed sidewalls and a body portion of a truck in a manner such that said bag assembly is stretched therebetween and held in an expanded configuration;

two brace securing loops provided on said interior surfaces of said opposed sidewalls, one in each lower corner thereof; and two brace securing pockets provided on said interior surfaces of said opposed sidewalls, one each in each upper corner thereof.

2. The collapsible container system of claim 1, wherein:

said rigid braces are formed in an X-shaped configuration.

3. The collapsible container system of claim 2, wherein:

each said rigid brace is constructed from two elongated sections of rigid material that are pivotally connected at the centers thereof.

* * * * *